United States Patent [19]
Kodali

[11] Patent Number: 5,693,715
[45] Date of Patent: *Dec. 2, 1997

[54] LINSEED OIL BASED COPOLYMER COATING COMPOSITION

[75] Inventor: Dharma Rao Kodali, Plymouth, Minn.

[73] Assignee: Cargill, Incorporated, Minneapolis, Minn.

[ * ] Notice: The term of this patent shall not extend beyond the expiration date of Pat. No. 5,788,805.

[21] Appl. No.: 290,808

[22] PCT Filed: Aug. 13, 1993

[86] PCT No.: PCT/US93/07601

§ 371 Date: Apr. 24, 1995

§ 102(e) Date: Apr. 24, 1995

[87] PCT Pub. No.: WO94/04579

PCT Pub. Date: Mar. 3, 1994

Related U.S. Application Data

[63] Continuation-in-part of Ser. No. 929,815, Aug. 14, 1992, Pat. No. 5,288,805.

[51] Int. Cl.$^6$ ............................... C08F 36/00; C08F 8/30
[52] U.S. Cl. .................. 525/190; 525/123; 525/185; 525/554; 526/283; 427/385.5
[58] Field of Search ....................... 525/190, 123, 525/185, 954; 524/554; 427/385.5; 526/283

[56] References Cited

U.S. PATENT DOCUMENTS

| | | | |
|---|---|---|---|
| 2,387,895 | 10/1945 | Gerhart | 260/23 |
| 2,390,530 | 12/1945 | Gerhart et al. | 260/23 |
| 2,392,140 | 1/1946 | Gerhart | 260/22 |
| 2,392,732 | 1/1946 | Gerhart | 250/5 |
| 2,397,600 | 4/1946 | Gerhart | 260/23 |
| 2,397,601 | 4/1946 | Gerhart et al. | 260/23 |
| 2,398,889 | 4/1946 | Gerhart | 260/23 |
| 2,399,179 | 4/1946 | Gerhart | 260/23 |
| 2,404,836 | 7/1946 | Gerhart et al. | 260/42 |
| 2,443,044 | 6/1948 | Lycan et al. | 260/407 |
| 4,100,120 | 7/1978 | Maekawa et al. | 521/7 |
| 4,180,645 | 12/1979 | Emmons et al. | 528/73 |
| 4,877,455 | 10/1989 | Brauer et al. | 106/244 |
| 5,288,805 | 2/1994 | Kodali | 525/190 |

FOREIGN PATENT DOCUMENTS

RO93008  7/1985  Romania .

OTHER PUBLICATIONS

CA 102 (24):205647n, Aqueous Agents for Preservation of Wood. JP 60013504 (1985).

*Primary Examiner*—Thurman K. Page
*Attorney, Agent, or Firm*—Fitch, Even, Tabin & Flannery

[57] ABSTRACT

A copolymer of linseed oil and dicyclopentadiene provides a new polymeric vehicle and formulated coating composition which are low in volatile organic compounds (VOCs), yet provide low viscosities which facilitate application to a substrate with existing equipment.

28 Claims, No Drawings

LINSEED OIL BASED COPOLYMER COATING COMPOSITION

This application is a continuation of international application PCT/US93/07601 having an international filing date of Aug. 13, 1993, which designates/elects the United States. PCT/US93/07601 is a continuation in part application of Ser. No. 929,815 which was filed Aug. 14, 1992, now U.S. Pat. No. 5,288,805. This application is directed to a linseed oil copolymer composition, a method of making same and a polymeric vehicle and a formulated coating composition which include the linseed oil copolymer composition described herein. More particularly, this application is directed to a copolymer of linseed oil and dicyclopentadiene which provides a new polymeric vehicle and which also provides a liquid diluent to provide a blended polymeric vehicle comprising two or more resins. The polymeric vehicle of the invention provides a formulated coating composition which is capable of being air dried at ambient temperature and which is low in volatile organic compounds (VOCs), yet provides low viscosities which facilitate application to a substrate with existing equipment.

BACKGROUND

For about the last fifty years, protective and decorative coatings based upon various polymeric resins have been increasingly used. These polymers have been utilized in many applications because they have provided a wide range of strength, flexibility, toughness, adhesion, degradation resistance and other film properties. Many polymers, however, are in dispersions or are solution polymers because they are prepared and used as a part of dispersions or solutions of polymers in organic solvents. In coatings technology, polymeric vehicles which include thermoplastic polymers require the use of organic solvents which often are toxic and/or subject to regulation that demand their reduction in coating compositions.

Environmental concern has become increasingly important. This concern not only extends to preservation of the environment for its own sake, but extends to safety for the public as to both living and working conditions. VOCs resulting from coating compositions which are applied and used by industry and by the consuming public are often not only unpleasant, but contribute to photochemical smog. Governments have established regulations setting forth guidelines relating to VOCs which may be released to the atmosphere. The U.S. Environmental Protection Agency (EPA) has established regulations relating to the amount of VOCs released to the atmosphere, such regulations being scheduled for adoption by the states of the United States. Guidelines relating to VOCs, such as those of the EPA, and environmental concerns are particularly pertinent to the paint and industrial coating industry which uses organic solvents which are emitted into the atmosphere.

Polymerization reaction products of linseed oil and dicyclopentadiene as described in U.S. Pat. No. 2,443,044 to Lycan, et al. are known. These products however, are a result of linseed oil which has a low iodine value. Moreover, these prior art products are viscous or are gels and have a high dicyclopentadiene content. When these products are used as a part of polymeric vehicle for a coating binder, a high dicyclopentadiene content interferes with desired or required properties such as hardness, flexibility and impact resistance. Moreover, these prior art linseed oil copolymers resulted in viscous systems which were not suitable for keeping solvent content at a minimum to provide a low VOC formulated coating composition which could be readily applied with existing coating equipment.

In the prior art, there were no restrictions on the amount of solvents used in formulated coatings; hence, large amounts of solvents were used to bring viscosities of air dried polymeric vehicles and formulated coating compositions to acceptable levels for application to a substrate.

An object of the present invention is to provide a new linseed oil composition having a viscosity as low as about 100 cps at 25° C. which is a copolymer of linseed oil and dicyclopentadiene and a method for making same.

Another object of the invention is to provide a polymeric vehicle which includes the copolymer of linseed oil and dicyclopentadiene and at least one other polymeric resin which polymeric vehicle will provide a coating binder which has a pencil hardness of at least about B and an impact resistance of at least about 160/100 (direct/reverse) after application to a substrate at a thickness of about 3 mils wet and after drying in air at ambient temperature for about one week.

Yet another object of the invention is to provide a low VOC formulated coating composition which includes the polymeric vehicle of the invention.

Still further objects and advantages of the invention will be found by reference to the following description.

SUMMARY OF THE INVENTION

The invention provides a linseed oil copolymer composition which is a copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 30 to about 5 weight percent of the reaction mixture, the linseed copolymer composition having a viscosity in the range of from about 100 to about 10,000 cps at 25° C. as measured on a Brookfield viscometer type R.V.F. at a 20 rpm setting. The linseed oil copolymer composition has a number average molecular weight in the range of from about 1000 to about 2600. The linseed oil copolymer composition may be air dried at ambient temperature to form a coating binder; or in an important aspect of the invention, may be combined with other resins as described below to form a blend which is effective for providing a polymeric vehicle or formulated coating composition which may be air dried at ambient temperature for about one week to form a coating binder with a pencil hardness of at least about B.

In one aspect, the method of the invention includes providing a reaction mixture comprising the blend of dicyclopentadiene and linseed oil as aforesaid and wherein the reaction mixture is provided by mixing the dicyclopentadiene with the linseed oil at a rate of from about 0.4 to about 0.9 volume percent per minute of the total dicyclopentadiene mixed with the linseed oil. The reaction mixture is heated at a temperature of not more than about 300° C. in a closed container. Preferably the dicyclopentadiene is added to the linseed oil.

In another important aspect, in the method of making the linseed oil copolymer, the reaction mixture is heated to a temperature of not more than 260° C., the dicyclopentadiene is mixed with the linseed oil as set forth above, but the temperature after the addition is not more than about 230° C. The "low temperature reaction" produces a copolymer with viscosities as low as 100 cps at 25° C.

The polymeric vehicle of the invention may be air dried, and in one aspect comprises a blend of from about 3 to about 90 weight percent of the linseed oil copolymer composition and from about 10 to about 97 weight percent of a second polymer selected from the group consisting of an oil modified urethane polymer, a short oil alkyd polymer, a medium oil alkyd polymer, a long oil alkyd polymer and a copolymer alkyd. In one aspect, the second polymer has a Gardner-Holt viscosity of about Z or less at about 50% solids at 25° C.

The "low temperature reaction" produces linseed oil copolymers of very low viscosities which viscosities vary depending upon the ratios of linseed oil and dicyclopentadiene used to make the copolymer and cook time after the mixing of the dicyclopentadiene with the linseed oil. These low viscosities go as low as 100 cps, but will also be in a range of from about 100 to about 1000 cps at 25° C. as measured on a Brookfield viscometer as described above. In an important aspect, where the "low temperature reaction" is used to make the linseed oil copolymer, less of the copolymer is combined with the second polymer for a suitable polymeric vehicle and formulated coating composition. Using the linseed oil copolymer from the low temperature reaction, the polymeric vehicle will comprise from about 3 to about 60 weight percent linseed oil copolymer and from about 40 to about 97 weight percent of a second polymer. If the higher reaction temperatures are used to make the linseed oil copolymer (but not more than about 300° C. as set forth above), a more viscous linseed oil copolymer results. In this aspect, when the linseed oil copolymer is combined with the second polymer to provide a polymeric vehicle and formulated coating composition, the polymeric vehicle will comprise from about 3 to about 90 weight percent linseed oil copolymer and from about 10 to about 97 weight percent second polymer.

In either aspect, when the second polymer is mixed with the linseed oil dicylopentadiene copolymer with a suitable solvent to less than about 350 grams VOC/liter, the resulting blend has only one phase and is clear and uniform and may be formulated to have a viscosity of about 300 cps or less. The polymeric vehicle and formulated coating composition of the invention provide a coating binder having an impact resistance of at least about 160/100 (direct/reverse) and a hardness of at least about B after about one week of drying at ambient temperature when applied to a substrate at a thickness of about 3 mils when wet. The polymeric vehicle will provide coating binder which will have a Sward hardness of at least about 20 after ambient temperature air drying in about one week when applied at a thickness of about 3 mils when wet. The polymeric vehicle and the formulated coating composition, which include the linseed oil copolymer composition, are low in VOCs and provide a formulated coating composition having less than about 2.9 pounds of VOCs per gallon of formulated coating composition.

In further aspect of the invention, the linseed oil dicyclopentadiene copolymer provides a liquid diluent which contemplates a method of reducing VOCs in a formulated coating composition by mixing the copolymer with one or more resins and optionally other ingredients to provide the formulated coating composition.

DESCRIPTION OF THE PREFERRED EMBODIMENTS

As used in this application, "polymer" means a polymer with repeating same or different monomeric units. "Polymeric vehicle" means all polymeric and resinous components in the formulated coating, i.e., before film formation. The polymeric vehicle may include a cross-linking agent. "Coating binder" means the polymeric part of the film of the coating after solvent has evaporated, and may include cross-linking. "Formulated coating" means the polymeric vehicle and solvents, pigments, catalysts and additives which my optionally be added to impart desirable application characteristics to the formulated coating and desirable properties such as opacity and color to the film. "VOC" means volatile organic compounds and "low VOC" means not more than about 2.9 pounds of VOCs per gallon of formulated coating composition or about 350 grams of volatile organic compounds per liter of formulated coating composition. "Volatile organic compounds" are defined by the U.S. Environmental Protection Agency ("EPA") as any organic compound which participates in atmospheric photochemical reactions, except for specific designated compounds which have negligible photochemical activity. Water is not a VOC. The following compounds generally have been designated as VOCs. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylestersulphuric acid, dimethyl-butanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloroethane, trichloroethene, 2,3-dimethylbutane, tetrachloroethane, dimethyl-3-methylenebicyclo-heptane, A-pinene, hexachloro-butadiene, methylnaphthalene, naphthalene, quinoline, methylnaphthalene, phenyl-propanone, dimethylbenzene, O-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethylbenzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichloro-benzene, trimethyl-pyridine, bromobenzene, methylcyclohexane, toluene, chlorobenzene, phenol, 2-methylpyridine, pentene, 1-pentane, bromochloro-propane, 1H-pyrrole, tetrahydrofuran, hexane, 1,4-dichlorobutane, cyclohexane, cyclohexene, pyridine, octane, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dimethyl-methylenebicyclo-heptane, 1,2-diethylbenzene, (1-methylpropyl)-benzene, acetic acid ethyl-ester, 1,3-diethylbenzene, cyclopentene, heptane, cis-dichloroethene, transdichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclopentasil-oxane, 1,3-dichlorobenzene, hexadecane, 2-methylthiophene, 3,3-dimethylpentane, 3-methyl-1-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicycloheptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxaldehyde, benzoyl nitro peroxide, bromochloropropane, dibromochloropropane, pentachlorobutadiene, dibromochloropropane, 2-butoxyethanol, bromopentachloroethane, tetradecamethylcycloheptasiloxane, trimethyl-pentanediol, dodecamethylcyclo-hexasil-oxane, hexamethylcyclotrisiloxane, octamethylcyclo-tetrasil-oxane, hexadecamethylcyclo-octasil-oxane, tridecane, tetradecane. "Film" is formed by application of the formulated coating to a base or substrate, evaporation of solvent, if present, and cross-linking if a cross-linking resin is present and/or required. "Thermoplastic polymeric vehicle" is a polymeric vehicle which does not require cross-linking to provide a film for a coating binder. "Thermosetting polymeric vehicle" is a polymeric vehicle which requires heat and cross-linking to provide a film for a coating binder.

"Air dried formulated coating composition" means a formulated coating composition that produces a satisfactory film without heating or baking, but which provides a satisfactory film at ambient temperature such as at about 20° C. and not greater than 40° C.

As used herein an "isocyanate group" is —N=C—O. As used herein, "diisocyanate" means an isocyanate compound with two isocyanate groups. Polyisocyanate means an isocyanate compound with more than two isocyanate groups. Urethane polymer means a compound which is the reaction product of a di- or polyisocyanate with a compound containing an active hydrogen reactive with an isocyanate group to provide the following: linkage

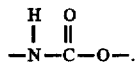

An oil modified urethane polymer is the reaction product of monomers which provide a urethane polymer with an additional oil reactant. The oil reactant comprises from about 50 to about 70 weight percent of all of the monomers reacted to provide the resulting oil modified polyurethane. The oil reactant is any drying or semi-drying oil with an iodine value of greater than 100. In an important aspect of the invention the oil modified polyurethane has a number average molecular weight in the range of from about 3,000 to about 25,000 and preferably from about 5,000 to about 13,000. In a particularly important aspect of the invention the oil modified polyurethane polymer includes the monomers pentaerythritol, soya oil, toluene diisocyanate and phthalic acid which are reacted to form the oil modified alkyd.

"Dicyclopentadiene" is a dimer of cyclopentadiene, and as commercially available may also contain dimers of cyclic and acyclic monomers of $C_4$ to $C_6$ compounds.

"Linseed oil" means a drying oil which includes triacylglycerols containing primarily linolenic, linoleic, oleic, stearic, palmitic and myristic acids. Generally, more than half of the oil is a derivative of linolenic acid.

"Alkyd resins" are condensation polymers of oil or fatty acid with polyols and polycarboxylic acids. The oil or fatty acid portion is from vegetable oils, such as linseed oil or its fatty acids. A frequently used polyol is pentaerythritol and a commonly used polycarboxylic acid is phthalic acid. Alkyds are classified into short-oil, medium-oil and long-oil alkyds to describe the differences in drying oil content and the resulting differences in properties.

A long oil alkyd is an alkyd having from about 57 to about 80 weight percent of drying and semi-drying oils or fatty acids with an iodine value greater than about 100.

A medium oil alkyd is an alkyd having from about 46 to about 56 weight percent of drying and semi-drying oils or fatty acids with an iodine value greater than about 100.

A short oil alkyd is an alkyd having from about 30 to 45 weight percent of drying and semi-drying oils or fatty acids with an iodine value greater than about 100.

A copolymer alkyd is an alkyd resin modified or further reacted with an unsaturated monomer having reactive double bonds which permit free radical reaction between the unsaturated monomer and the alkyd resin.

Drying and semi-drying oils used in the invention have a iodine value greater than about 100 and include but are not limited to tung oil, linseed oil, dehydrated caster oil, safflower oil, soya oil, canola oil, rapeseed oil, cottonseed oil and sunflower oil.

The linseed oil copolymer composition is the copolymer reaction product of linseed oil having an iodine value in the range of from about 170 to about 195 and dicyclopentadiene. The reaction mixture which provides the linseed oil copolymer composition comprises from about 70 to about 95 weight percent linseed oil and from about 30 to about 5 weight percent dicyclopentadiene. In an important aspect, the reaction mixture has from about 10 to about 26 weight percent dicyclopentadiene and preferably from about 16 to about 26 weight percent dicyclopentadiene.

The copolymer composition has a viscosity in the range of from about 100 to about 10,000 cps at 25° C. measured on a Brookfield viscometer type R.V.F. at a 20 rpm setting and a number average molecular weight in the range of from about 1000 to about 2600. In an important aspect when the copolymer is made under low temperature reaction conditions, the viscosity of the copolymer composition is from about 100 to about 1000 cps at 25° C. and preferably from about 300 to about 700 cps at 25° C. as measured on a Brookfield viscometer as described above.

About 30 to about 70 weight percent of the copolymer composition has a molecular weight higher than the linseed oil and from about 0 to about 5 weight percent of the copolymer composition has a molecular weight less than about 500. In one aspect, the copolymer composition made under the higher temperature conditions has from about 3.7 to about 4.8 acyl chain double bonds compared to approximately about 6.3 acyl chain double bonds in linseed oil, and about 25 to about 90 percent of the acyl chains of the oil are cross-linked.

The linseed oil and the dicyclopentadiene are mixed by adding the dicyclopentadiene to the linseed oil or by simultaneously mixing the ingredients into a reaction vessel. By way of example, the linseed oil dicyclopentadiene copolymer composition is made by charging the linseed oil into a closed reactor purged with an inert gas such as nitrogen. The oil is heated to about 260° C. with constant stirring which is continued throughout the reaction with dicyclopentadiene. Dicyclopentadiene is added at a slow rate (from about 0.4 volume percent to about 0.9 volume percent per minute of the total dicyclopentadiene to be added) under the surface of the linseed oil in the reactor where it is heated. While not intending to be bound by any theory, it is believed that as the dicyclopentadiene enters the vessel the dicyclopentadiene dedimerizes into two molecules of cyclopentadiene and reacts with the linseed oil double bonds. The linseed oil copolymer produced by reacting linseed oil with a low concentration of cyclopentadiene produces a copolymer with a viscosity which permits a low VOC coating composition and minimizes the formation of cyclopentadiene oligomers which may have a deleterious effect on the film performance of a coating binder. After the addition of the dicyclopentadiene, the heating of the reaction mixture is continued at a temperature of not more than about 300° C., and preferably not more than about 275° C. for about 0.5 hour to about 10 hours; preferably from about 1.0 hours to about 2.0 hours. The reaction is permitted to proceed until a desired viscosity is reached such as from about 100 to about 10,000 cps at 25° C. Thereafter the copolymer reaction product is cooled and removed from the reaction vessel. Optionally, the volatile components left in the reaction vessel may be removed by applying a vacuum such as about less than 50 mm Hg during about the last 30 minutes to about the last hour of the reaction.

In an important aspect of the invention that is directed to the method of making the linseed oil dicyclopentadiene copolymer, the linseed oil is heated to 260° C., the rate of addition is in the range of from about 0.4 to about 0.9 volume percent per minute of the total dicyclopentadiene as set forth above, the 260° C. temperature being maintained throughout the addition, but preferably the addition time of the dicyclopentadiene to the linseed oil is kept to three hours or less. The cook time after the addition of the dicyclopentadiene is about 1½ hours or less at about 230° C. This minimizes polymerization of the linseed oil dicyclopentadiene copolymer and the final molecular weight of that copolymer. Using the latter low temperature reaction procedures, viscosities of the linseed oil dicyclopentadiene copolymer as low as from about 100 to about 1000 cps at 25° C. can be achieved.

In one aspect of the invention, the reaction mixture comprises from about 75 to about 80 weight percent linseed oil having an iodine value in the range of from about 175 to about 190 and from about 20 to about 25 weight percent dicyclopentadiene. Using the method of the invention which contemplates the higher temperature reaction conditions (not more than 300° C.), the resulting composition from the copolymerization of linseed oil and dicyclopentadiene has a viscosity in the range of from about 3,000 to about 7,500 cps at 25° C.

The linseed oil dicyclopentadiene copolymer may be used by itself as an air dried polymeric vehicle for a coating binder. If a second polymer is used, the polymeric vehicle will comprise from about 3 to about 90 weight percent linseed oil copolymer and from about 10 to about 97 weight percent second polymer.

In an important aspect, however, using the linseed oil copolymer made from the "low temperature reaction" described above, the invention includes a polymeric vehicle which comprises a blend of from about 3 to about 60 weight percent, based upon the total weight of the polymeric vehicle, linseed oil dicyclopentadiene copolymer and from about 40 to about 97 weight percent of a second polymer. The second polymer is selected from the group consisting group of an oil modified urethane polymer, a short oil alkyd polymer, a medium oil alkyd polymer, a long oil alkyd polymer and a copolymer alkyd. When the second polymer is mixed with the linseed oil dicyclopentadiene copolymer in the ratio in the range of about 3:97 to about 60:40 (linseed oil dicyclopentadiene copolymer: second polymer), and blended with a suitable solvent to about 350 grams VOC/ liter or less, the resulting formulated coating composition is a clear and uniform blend and may be formulated to have a viscosity of 300 cps or less.

The amount of second polymer varies with the type of second polymer blended with the linseed oil dicyclopentadiene copolymer to make the polymeric vehicle or the formulated coating composition. Using the linseed oil copolymer made from the low temperature reaction with oil modified urethane and long oil alkyd resins, in an important aspect of the invention the polymeric vehicle comprises from about 3 to about 60 and preferably from about 10 to about 40 weight percent of linseed oil copolymer. With medium oil alkyd resins, in an important aspect of the invention the polymeric vehicle comprises from about 3 to about 50 and preferably from about 10 to about 40 weight percent of the linseed oil copolymer. With short oil alkyd and copolymer alkyd resins, in an important aspect of the invention the polymeric vehicle comprises from about 3 to about 10 and preferably from about 5 to about 10 weight percent of the linseed copolymer.

The linseed oil dicyclopentadiene copolymer acts as a liquid diluent replacing solvent which is a source of VOCs. Hence, the invention provides a method of reducing VOCs by mixing the linseed oil dicyclopentadiene copolymer with a second polymer to provide a polymeric vehicle and formulated coating composition. The polymeric vehicle is effective for providing a formulated coating composition which is low in VOCs, less than 2.9 pounds of VOCs per gallon of formulated coating composition. Moreover, especially in respect to the linseed oil copolymer made from the low temperature reaction, the linseed oil copolymer provides a method for reducing the viscosity and increasing the solids content of a polymeric vehicle and formulated coating composition by mixing the linseed oil copolymer with a second polymer to provide the polymeric vehicle.

Where the linseed oil copolymer is made using the method which contemplates the higher reaction temperatures (not more than 300° C.), the polymeric vehicle provides an air dried formulated coating composition when the linseed oil copolymer is combined with the second polymer. In this aspect where the second polymer is a long oil alkyd or an oil modified, the linseed oil copolymer comprises from about 3 to about 90 weight percent and preferably from about 50 to about 70 weight percent of the polymeric vehicle. Where the second polymer is a medium oil alkyd, the linseed oil copolymer comprises from about 3 to about 30 and preferably from about 5 to about 15 weight percent linseed oil copolymer. Short oil alkyds and copolymer alkyd resins are not readily compatible with the linseed oil copolymer made at higher temperatures.

In the aspect of the invention using the linseed oil copolymer which is made using the method which contemplates the higher reaction conditions and an oil modified polyurethane in a ratio in the range of from about 50/50 to about 70/30 linseed oil copolymer to the second copolymer, the oil modified urethane has a viscosity of Z or less at 25°

C. and from about 30 to about 60 weight percent solids. The linseed oil copolymer may be a product of polymerization and reaction comprising from about 75 to about 80 weight percent linseed oil having an iodine value in the range of from about 175 to about 190 and from about 20 to about 25 percent dicyclopentadiene. In this aspect the linseed oil copolymer has a viscosity in the range from about 3,000 to about 7,500 cps at 25° C.

In one aspect, a polymeric vehicle is provided which when mixed with Rule 66 mineral spirits (typically having about 2 or less weight percent aromatics, about 44 weight percent paraffins, about 56 weight percent naphthenes and an initial boiling point of about 323° F. and dry end point of about 381° F.) at level of less than about 2.9 pounds of VOC/gallon formulated coating has a viscosity in the range of from about 70 to about 300 cps. This formulated coating can be air dried to provide a coating binder having an impact resistance of at least about 160/100 and a hardness of at least about B when applied to a substrate at a thickness of about 3 mils when wet and air dried for not more than about 1 week at an ambient temperature.

The formulated coating composition of the invention includes the polymeric vehicle, pigments, solvents, driers, coalescents and other additives which will provide a suitable coating binder. The formulated coating composition will have solids in the range of from about 50 to about 75 weight percent and less than about 2.9 pounds of VOCs/gallon of formulated coating composition. Preferably the formulated coating composition will have a viscosity in the range of from about 70 to about 300 cps at 25° C. Any hydrocarbon solvent may be suitable for the formulated coating composition. Solvents which my be used to make the formulated coating composition include mineral spirits, naphthas, xylenes, toluenes, trimethyl benzenes, ethyl toluenes and ethyl benzenes and mixtures thereof. The combination of the linseed oil copolymer and oil modified polyurethane when blended with the previously described solvents and especially Rule 66 mineral spirits provides a formulated coating composition which is an important aspect of the invention. This formulated coating composition is a low VOC composition which my be air dried at not greater than about 40° C. to provide a coating binder having a pencil hardness of at least about 4B (ASTM Test D3363-74) in about 48 hours, dry through (ASTM Test D1640) in not more than about 4.5 hours, an impact resistance of at least about 160/100 (direct/ reverse) in about 1 week and a Sward hardness of at least 20 (ASTM Test D2134-66) in about 1 week, when applied to a substrate at a thickness of about 3 mils when wet.

The following examples set forth exemplary methods of making the copolymer of linseed oil, the polymeric vehicle and formulated coating composition according to the invention.

EXAMPLE I

A. Preparation of the Copolymer of Linseed Oil and Dicyclopentadiene

Linseed oil (LSO) 310 g (75 wt %) is charged into a closed reactor and purged with nitrogen for a few minutes. The oil is heated to about 260° C. with constant stirring. The stirring is continued throughout the reaction. Dicyclopentadiene 104 ml (25 wt %) is added at a slow addition rate of 0.4 to 0.6 ml/min at the bottom of the vessel under the hot LSO. Dicyclopentadiene is commercially available as 97 RM from Exxon Chemical, Houston, Tex. 77253-3272.

After the addition of DCPD is complete the reaction mixture is kept at 260° C. for 3.5 hours more with stirring. Then the mixture is stripped at 1 mm Hg for 30 minutes and removed from the reaction vessel. Thereafter, the product is cooled and the final product viscosity is 7,100 cps.

B. Preparation of Formulated Coating Composition

The product of Example IA is formulated with an oil modified polyurethane commercially available as Resin 4355 from Cargill Incorporated, Minneapolis, Minn., the formulated coating composition comprising 60 weight percent copolymer of linseed oil and 40 weight percent of oil modified polyurethane, based upon the total weight of oil modified polyurethane and copolymer of linseed oil. The latter ingredients are blended with Rule 66 mineral spirits and driers such as 6% Calcium Cem-all, 12% Cobalt Cem-all, 12% Zirconium Cem-all (from Mooney Chemicals, Cleveland, Ohio), Activ-8 (from R.T. Vanderbilt, Norwalk, Conn.) and Exkin #2 (from Huls America, Piscataway, N.J.) (comprising about 0.5 weight percent based upon the weight of total resin solids) to provide a formulated coating composition having about 342 g/liter VOCs, a density of 7.65 lbs./gal., and 62.6% solids (ASTM Test D2389-81). Upon application to a substrate, at a thickness of about 3 mils when wet, the formulated coating composition provided a film with the following characteristics.

| | |
|---|---|
| Tack Free: | 4.25 hours |
| Set to Touch: | 10 minutes |
| Surface Dry: | 1.50 hours |
| Dry Through: | 2.00 hours |
| Print Free: | 3.00 hours |
| Pencil Hardness: | 3B in 24 hours; |
| | 2B in 48 hours; |
| | B in one week; and |
| | HB in two weeks |
| Sward Hardness: | 10 in 24 hours; |
| | 14 in 48 hours; |
| | 26 in one week; and |
| | 36 in two weeks |
| Flexibility: | ⅛" mandrel bend test-passed |
| Impact: | 160/160 (direct/reverse) |

The physical properties and the drying characteristics of the formulated coatings prepared as described in Example I (with low VOC) are compared with the commercial high VOC containing oil modified polyurethane and are shown in Table I below.

TABLE I

| | Linseed Oil Copolymer Formulated Coating | Oil Modified Polyurethane Commercial Resin |
|---|---|---|
| VOC (g/lit) | 342 | 466 |
| Solids (wt %) | 62.2 | 47.7 |
| Viscosity (cp) | 120 | 140 |
| Density (lbs./gal.) | 7.63 | 7.65 |
| Tack Free (hrs) | 4.25 | 2.5 |
| Set to Touch (min.) | 10 | 10 |
| Surface Dry (hrs) | 1.5 | 0.5 |
| Dry Through (hrs) | 2.0 | 1.0 |
| Print Free | 3.0 | 1.25 |
| Pencil Hardness | | |
| 48 weeks | 2B | B |
| 1 week | B | HB |

TABLE I-continued

| | Linseed Oil Copolymer Formulated Coating | Oil Modified Polyurethane Commercial Resin |
|---|---|---|
| Sward Hardness | | |
| 48 hrs. | 14 | 17 |
| 1 week | 26 | 42 |
| Flexibility | ⅛" Mandrell Bend test-passed | ⅛" Mandrell Bend test-passed |
| Impact (3 weeks) | 160/160 | 160/120 |

EXAMPLE II

A steel parr reactor is charged with 346.5 grams of linseed oil and the reactor is closed and purged with nitrogen three times. The linseed oil is heated to 260° C., the developed pressure is released, the reactor sealed, and the contents of the reactor are stirred throughout the reaction. Dicyclopentadiene (103.5 grams or 106 ml) is added to the hot oil over a period of 205 minutes at an average addition rate of 0.5 ml/minute. By the end of the addition the pressure in the reactor increases up to 50 psi. After the addition of the dicyclopentadiene, the reaction mixture is maintained at 260° C. for 30 minutes. The pressure of the reactor is then released to a cold trap and the vessel is connected to a pump to strip the volatile components from the vessel and the resin. The stripping is continued for 30 minutes. At the end of the stripping, the stirring of the reaction mixture is stopped, the reaction mixture is cooled and the linseed oil copolymer is transferred to a flask. The total cook time after the dicyclopentadiene addition is one hour. The viscosity of the linseed oil copolymer resin is 600 cps at 25° C. measured by a Brookfield viscometer.

The linseed oil copolymer resin of this example is formulated at three different levels with a commercial oil modified urethane resin (available from Cargill, Incorporated as Cargill 4355 Resin) and with driers and Rule 66 Mineral Spirits as shown in Table II. The drying properties of these formulated coating compositions are shown in Table III.

TABLE II

| Formulation # | Wt of 4355 of Polymeric Vehicle | VOC g/lit | Viscosity #4 Ford Cup (sec) | Density lbs/gal | Wt % Solids |
|---|---|---|---|---|---|
| 1 | 40 | 337 | 26 | 7.6 | 63 |
| 2 | 50 | 364 | 23 | 7.6 | 60 |
| 3 | 60 | 342 | 49 | 7.7 | 62.9 |

TABLE III

| Formulation # | Dry Thru (hrs) | Pencil Hardness 1 day | 2 day | 1 Week | Sward Hardness 1 day | 2 day | 1 Week |
|---|---|---|---|---|---|---|---|
| 1 | 3 | 4B | 3B | B | 10 | 14 | 28 |
| 2 | 3.5 | 4B | 3B | B | 14 | 15 | 30 |
| 3 | 4 | 4B | 3B | B | 16 | 20 | 32 |

For comparison, two samples of commercially available heat polymerized linseed oil with Gardener Holt viscosities of Q and Z (Cargill's KCQ and KCZ resins, respectively) are formulated with the 4355 oil modified urethane resin (at a level of 60 weight percent Cargill resin and 40 weight percent urethane resin based upon the weight of polymer vehicle), driers and Rule 66 Mineral Spirits as shown in Table IV. The drying and film characteristics of these comparative films are shown in Table V.

TABLE IV

| Heat Polymerized Linseed Oil | VOC g/lit | Viscosity #4 Ford Cup (sec) | Density lbs/gal. | Wt % Solids |
|---|---|---|---|---|
| KCQ | 325.4 | 23 | 7.5 | 63.8 |
| KCZ | 343.4 | 96 | 7.6 | 62.3 |

TABLE V

| Formulation # | Dry Thru (hrs) | Pencil Hardness 1 day | 2 day | 1 Week | Sward Hardness 1 day | 2 day | 1 Week |
|---|---|---|---|---|---|---|---|
| KCQ | 5.5 | 7B | 6B | 3B | 4 | 4 | 6 |
| KCZ | 3.0 | 7B | 6B | 3B | 4 | 4 | 10 |

EXAMPLE III 342 grams of linseed oil is charged into a parr reactor and the reactor is purged with nitrogen three times. The reaction vessel is closed and heated to 260° C. with stirring. Pressure due to heat expansion is released and vessel is sealed. Dicyclopentadiene (108 grams or 110.5 ml) is added gradually to the hot oil over 180 minutes with continued stirring. After addition of the dicyclopentadiene is complete, the temperature of the reaction is reduced to 230° C. and the reaction is continued for 90 minutes with the stripping of the volatile components by a vacuum pump at 1 mm Hg pressure for the last hour of the 90 minutes. At the end of the reaction, the light amber resin is cooled. At 25° C. the resin has a viscosity of 485 cps.

The copolymer synthesized above is evaluated in a high solids coating by incorporating 10 to 30% weight percent linseed oil copolymer. The physical characteristics of these three different formulations are compared with the high solids control in Table VI.

This example shows that the viscosities of the formulated coating composition were reduced and the hardness was improved by adding the linseed oil copolymer.

TABLE VI

| Description | High Solids Oil Modified Urethane Control | Control + 10% Diluent | Control + 20% Diluent | Control + 30% Diluent |
|---|---|---|---|---|
| VOC g/liter | 354 | 353 | 352 | 349 |
| Viscosity #4 Ford Cup (sec) | 28 | 23 | 21 | 21 |
| Dry Time (hrs) (6 mil gap application) | 5.5 | 3.5 | 3 | 4 |
| Pencil Hardness (4 mil gap application) | | | | |
| 1 day | 6B | 4B | 5B | 5B |
| 2 days | 4B | 3B | 4B | 4B |
| 1 week | 2B | B | B | B |

TABLE VI-continued

| Description | High Solids Oil Modified Urethane Control | Control + 10% Diluent | Control + 20% Diluent | Control + 30% Diluent |
|---|---|---|---|---|
| Sward Hardness (4 mil gap application) | | | | |
| 1 day | 9 | 9 | 12 | 9 |
| 2 days | 13 | 14 | 16 | 15 |
| 1 week | 14 | 17 | 21 | 22 |
| Dry Film Thickness (mil) (4 mil gap application) | 1.3 | 1.2 | 1.3 | 1.3 |

EXAMPLE IV

A 50-gallon capacity pilot plant reactor is charged with 283 pounds of linseed oil (76.5 weight %) and purged with nitrogen three times. The reactor is sealed and heated to 260° C. with constant stirring. Dicyclopentadiene (87 pounds or 23.5 weight %) is added at a slow addition rate over a period of 175 minutes to under the linseed oil surface while maintaining the temperature at 260° C. Stirring is continued throughout the reaction. After the addition of the dicyclopentadiene, the reactants are cooked for 25 minutes while the temperature of the reaction is dropped to 230° C. Then the pressure of the reactor is vented into a cold trap and connected to a vacuum pump. The volatile components of the reaction are stripped at 230° C. for an additional 40 minutes. At the end of this time, the reactor is cooled to room temperature. The final product obtained has a brookfield viscosity of 660 cps at 25° C. on Brookfield type R.V.F. at 20 rpm setting.

The product made above is formulated with an oil modified urethane commercially available as resin 4355 from Cargill, Incorporated, Minneapolis, Minn. The formulated coating composition comprised 40 weight percent of linseed oil copolymer made as above and 60 weight percent of oil modified urethane Cargill 4355, based upon the total weight of resin solids. The resin solids thus mixed are blended with rule 66 mineral spirits and driers such as 12% cobalt cem-all, 12% zirconium cem-all (from Mooney Chemicals, Cleveland, Ohio), Activ-8 (from R. V. Vanderbilt, Norwalk, Conn.) and Exkin #2 (from Hubs America, Piscataway, N.J.) (the driers comprise 0.5 weight percent based upon the weight of resin solids) to provide a low VOC formulated coating composition.

The physical properties and the drying characteristics of the low VOC formulated coating prepared above are compared with the high VOC containing oil modified polyurethane (Cargill's resin 4355) and are shown in Table VII below.

TABLE VII

| | Low VOC containing Linseed Oil based formulated coating | High VOC containing Cargill's Oil modified 4355 coating |
|---|---|---|
| VOC (g/lit) | 350 | 461 |
| Density (lb/gal.) | 7.7 | 7.5 |
| Solids (wt. %) | 62 | 48.6 |
| Viscosity (Ford #4 cup) | 40 sec. | 60 sec. |
| Surface Dry (hrs) | 1.0 | 0.5 |
| Dry Through (hrs) | 7.0 | 1.5 |
| Pencil Hardness | | |
| 24 hrs. | 3B | B |
| 48 hrs. | B | B |
| 1 week | B | HB |
| 2 weeks | HB | HB |
| Sward Hardness | | |
| 24 hrs. | 10 | 34 |
| 48 hrs. | 19 | 56 |
| 1 week | 28 | 54 |
| 2 weeks | 37 | 56 |
| Flexibility | ¼" Mandrell Bend test-passed | ¼" Mandrell Bend test-passed |
| Impact (3 weeks) | 160/160 (direct/reverse) | 160/120 (direct/reverse) |
| Application | 4 gap | 4 gap |
| Dry Film Thickness | 1 mil. | 0.8 mil. |

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A composition which is the copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 5 to about 30 weight percent of the reaction mixture, the reaction of the dicyclopentadiene and linseed oil providing a composition having a viscosity in the range of from about 100 to about 10,000 cps at 25° C. and wherein the reaction mixture is provided by mixing dicyclopentadiene with the linseed oil at a rate of from about 0.4 to about 0.9 volume percent per minute of the total dicyclopentadiene mixed with the linseed oil, the reaction mixture being heated at a temperature of not more that about 300° C. in a closed container.

2. The composition as recited in claim 1 wherein the composition has a number average molecular weight in the range of from about 1000 to about 2600.

3. The composition as recited in claim 1 wherein about 30 to about 70 percent of the composition has a higher molecular weight than the linseed oil.

4. The composition as recited in claim 1 wherein the composition having a viscosity in the range of from about 300 to about 700 cps at 25° C.

5. The composition as recited in claim 1 wherein the temperature of the reaction mixture prior to and during the mixing of the dicyclopentadiene with the linseed oil is not greater than about 260° C. and the temperature of the reaction mixture after the mixing of the dicyclopentadiene with the linseed oil is not greater than about 230° C. and the viscosity of the composition is in the range of from about 100 to about 1000 cps at 25° C.

6. The composition as recited in claims 1, 2, 3, 4 or 5 wherein the dicyclopentadiene is added to the linseed oil.

7. A polymeric vehicle capable of being air dried at about ambient temperature, which polymeric vehicle provides a coating binder having an impact resistance of at least about 160/100 (direct/reverse) and a Sward hardness of at least about 20 after air drying for about 1 week and when applied to a substrate at a thickness of about 3 mils wet, the polymeric vehicle comprising a mixture of linseed oil copolymer and a second polymer in a ratio in the range of from about 3/97 to about 90/10 linseed oil copolymer to second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 30 to about 5 weight percent of the reaction mixture, wherein the reaction mixture is provided by mixing dicyclopentadiene with the linseed oil at a rate of from about 0.4 to about 0.9 volume percent per minute of the total dicyclopentadiene mixed with the linseed oil, the reaction mixture being heated to a temperature of not more than about 300° C. in a closed container, the linseed oil copolymer having a viscosity in the range of from about 100 to about 10,000 cps at 25° C., the second polymer selected from the group consisting of an oil modified urethane polymer, a short oil alkyd polymer, a medium oil alkyd polymer, a long oil alkyd polymer and a copolymer alkyd polymer.

8. A polymeric vehicle as recited in claim 7 wherein the second polymer is the oil modified urethane polymer and the drying oil is selected from the group consisting of tung oil, linseed oil, dehydrated caster oil, safflower oil, soya oil, canola oil, rapeseed oil, cottonseed oil, sunflower oil and mixtures thereof.

9. A polymeric vehicle as recited in claim 7 wherein the second polymer has a solids level in the range of from about 30 to about 60 weight percent.

10. The polymeric vehicle as recited in claim 7 wherein the polymeric vehicle provides the coating binder having a pencil hardness of at least about 4B by air drying in not more than 48 hours at a temperature of not more than about 40° C.

11. The polymeric vehicle of claim 7 wherein the linseed oil copolymer has a viscosity in the range of from about 300 to about 700 cps at 25° C.

12. A formulated coating composition which has less than about 2.9 pounds of volatile organic compounds per gallon of the formulated coating composition and which formulated coating composition will provide a coating binder having a pencil hardness of at least about B and an impact resistance of at least about 160/100 (direct/reverse) after application to a substrate at a thickness of about 3 mils wet and drying at about ambient temperature for about one week, the formulated coating composition comprising a polymeric vehicle which comprises a mixture of linseed oil copolymer and second polymer in a ratio in the range of from about 3/97 to about 90/10 linseed oil copolymer to second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 30 to about 5 weight percent of the reaction mixture, wherein the reaction mixture is provided by mixing dicyclopentadiene with the linseed oil at a rate of from about 0.4 to about 0.9 volume percent per minute of the total dicyclopentadiene mixed with the linseed oil, the reaction mixture being heated to a temperature of not more than about 300° C. in a closed container, the linseed oil copolymer having a viscosity in the range of from about 100 to about 10,000 cps at 25° C., the second polymer selected from the group consisting of a oil modified urethane polymer, a short oil alkyd polymer a medium oil alkyd polymer, a long oil alkyd polymer and a copolymer alkyd polymer.

13. A formulated coating composition as recited in claim 12 wherein the drying oil is selected from the group consisting of tung oil, linseed oil, dehydrated caster oil, safflower oil, soya oil, canola oil, rapeseed oil, cottonseed oil, sunflower oil and mixtures thereof.

14. The formulated coating composition as recited in claim 12 wherein the linseed oil copolymer has a number average molecular weight in the range of from about 1000 to about 2600.

15. A formulated coating composition as recited in claim 14 wherein the second polymer has a solids level in the range of from about 30 to about 60 weight percent.

16. The formulated coating composition as recited in claim 12 wherein the linseed oil copolymer has a viscosity in the range of from about 300 to about 700 cps at 25° C.

17. A formulated coating composition as recited in claims 12, 13, or 16 wherein the temperature of the reaction mixture prior to and during the mixing of the dicyclopentadiene with the linseed oil is not greater than about 260° C. and the temperature of the reaction mixture after the mixing of the dicyclopentadiene with the linseed oil is not greater than about 230° C. and the viscosity of the composition is in the range of from about 100 to about 1000 cps at 25° C. and wherein the dicyclopentadiene is added to the linseed oil.

18. A method for making a copolymer of linseed oil and dicyclopentadiene, the method comprising mixing linseed oil and dicyclopentadiene under nitrogen, the linseed oil having a iodine value in the range of from about 170 to about 195, the dicyclopentadiene being mixed with the linseed oil at a rate of from about 0.4 volume percent to about 0.9 volume percent per minute of the total dicyclopentadiene to be mixed at a temperature of not greater than about 300° C. in a closed container, the linseed oil comprising from about 70 to about 95 weight percent of the linseed oil and dicyclopentadiene mixture and the dicyclopentadiene comprising from about 30 to about 5 weight percent of the linseed oil and dicyclopentadiene mixture, the copolymer having a viscosity in the range of from about 100 to about 10,000 cps at 25° C.

19. The method as recited in claim 18 wherein the temperature of the reaction mixture prior to and during the mixing of the dicyclopentadiene with the linseed oil is not greater than about 260° C. and the temperature of the reaction mixture after the mixing of the dicyclopentadiene with the linseed oil is not greater than about 230° C., the copolymer having a viscosity in the range of from about 100 to about 1000 cps at 25° C.

20. A composition which when combined with a second polymer is effective for providing a polymeric vehicle which polymeric vehicle will provide a formulated coating composition having not more than about 2.9 pounds per gallon volatile organic compounds and which polymeric vehicle will provide a coating binder having a pencil hardness of at least about B and an impact resistance of at least about 160/100 (direct/reverse) after application to a substrate at a thickness of about 3 mils wet and drying at about ambient temperature for about one week, the composition comprising a copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 5 to about 30 weight percent of the reaction mixture, the composition having a viscosity in the range of from about 100 to about 10,000 cps at 25° C., the reaction mixture being provided by the addition of the dicyclopentadiene to the linseed oil at a rate of from about 0.4 to about 0.9 volume percent per minute of the total dicyclopentadiene added to the linseed oil and the reaction mixture being heated at a temperature of not more than 300° C. in a closed container.

21. The composition as recited in claim 20 wherein the composition has a number average molecular weight in the range of from about 1000 to about 2600.

22. The composition as recited in claim 20 wherein the reaction mixture comprises from about 75 to about 80 weight percent linseed oil having an iodine value in the range of from about 175 to about 190 and from about 20 to about 25 weight percent dicyclopentadiene.

23. The composition as recited in claim 20 wherein the temperature of the reaction mixture prior to and during the addition of the dicyclopentadiene with the linseed oil is not greater than about 260° C. and the temperature of the reaction mixture after the addition of the dicyclopentadiene with the linseed oil is not greater than 230° C., and the viscosity of the composition is in the range from about 100 to about 1,000 cps and 25° C.

24. A method for reducing volatile organic compounds in a formulated coating composition, the method comprising mixing a linseed oil dicyclopentadiene copolymer with a second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 30 to about 5 weight percent of the reaction mixture, wherein the reaction mixture is provided by mixing dicyclopentadiene with the linseed oil at a rate of from about 0.4 to about 0.9 volume percent per minute of the total dicyclopentadiene mixed with the linseed oil, the reaction mixture being heated to a temperature of not more than about 300° C. in a closed container, the linseed copolymer composition having a viscosity in the range of from about 100 to about 10,000 cps at 25° C., the second polymer selected from the group consisting of an oil modified urethane polymer, a short oil alkyd polymer, a medium oil alkyd polymer, and long oil alkyd polymer and a copolymer alkyd polymer.

25. A method as recited in claim 24 wherein the dicyclopentadiene is added to the linseed oil to form the reaction mixture, the temperature of the reaction mixture prior to and during the addition of the dicyclopentadiene with the linseed oil is not greater than about 260° C. and the temperature of the reaction mixture after the addition of the dicyclopentadiene with the linseed oil is not greater than about 230° C., and the viscosity of the copolymer is in the range from about 100 to about 1,000 cps and 25° C.

26. A method for reducing the viscosity of a polymeric vehicle and increasing the solids content thereof, the polymeric vehicle effective for providing a coating binder having a pencil hardness of at least about B and an impact resistance of at least about 160/100 (direct/reverse) after application to a substitute at a thickness of 3 mils wet and drying at about ambient temperature for about one week, the method comprising mixing a linseed oil dicyclopentadiene copolymer with a second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 95 weight percent of the reaction mixture and the dicyclopentadiene comprising from about 30 to about 5 weight percent of the reaction mixture, the linseed copolymer composition having a viscosity in the range of from about 100 to about 10,000 cps at 25° C., the second polymer selected from the group consisting of an oil modified urethane polymer, a short oil alkyd polymer, a medium oil alkyd polymer, and long oil alkyd polymer and a copolymer alkyd polymer, and wherein the dicyclopentadiene is added to the linseed oil to form the reaction mixture, the temperature of the reaction mixture prior to and during the addition of the dicyclopentadiene with the linseed oil is not greater than about 260° C. and the temperature of the reaction mixture after the addition of the dicyclopentadiene with the linseed oil is not greater than 230° C., and the viscosity of the copolymer is in the range from about 100 to about 1,000 cps and 25° C.

27. A polymeric vehicle as recited in claim 7 wherein the temperature of the reaction mixture prior to and during the mixing of dicyclopentadiene with the linseed oil is not greater than about 260° C. and the temperature of the reaction mixture after the mixing of the dicyclopentadiene with the linseed oil is not greater than about 230° C. and the viscosity of the composition is in the range of from about 100 to about 1000 cps at 25° C. and wherein the dicyclopentadiene is added to the linseed oil.

28. A polymeric vehicle as recited in claim 7, 8 or 10 wherein the temperature of the reaction mixture prior to and during mixing of the dicyclopentadiene with the linseed oil is not greater than about 260° C. and the temperature of the reaction mixture after the mixing of the dicyclopentadiene with the linseed oil is not greater than about 230° C. and the viscosity of the composition is in the range of from about 100 to about 1000 cps at 25° C. and wherein the dicyclopentadiene is added to the linseed oil.

* * * * *